United States Patent

[11] 3,578,821

[72] Inventor Michel Guettier
 Billancourt, France
[21] Appl. No. 807,369
[22] Filed Mar. 14, 1969
[45] Patented May 18, 1971
[73] Assignees Regie Nationale Des Usines Renault
 Billancourt (Hauts de Seine), France;
 Automobiles Peugot
 Paris, France
[32] Priority Mar. 27, 1968
[33] France
[31] 145,645

[54] BRAKE LIMITERS
 1 Claim, 5 Drawing Figs.
[52] U.S. Cl. .................................................. 303/22,
 137/595, 188/152, 303/6
[51] Int. Cl. .................................................. B60t 15/00,
 B60t 8/18
[50] Field of Search .................................................. 188/151,
 151.11, 152, 152.02, 152.11, 195; 303/66, 52, 54,
 22, 22 (A); 60/(Inquired); 91/(Inquired);
 92/(Inquired); 137/595, 627.5

[56] References Cited
UNITED STATES PATENTS

| | | | |
|---|---|---|---|
| 3,207,561 | 9/1965 | Bueler | 303/52 |
| 3,219,396 | 11/1965 | Bueler | 303/52 |
| 3,266,851 | 8/1966 | Bueler | 303/52 |
| 3,279,867 | 10/1966 | Bueler | 303/52 |
| 3,309,149 | 3/1967 | Bueler | 303/52X |
| 3,366,424 | 1/1968 | Edwards | 303/52 |
| 3,479,096 | 11/1969 | Cruse | 303/52X |

Primary Examiner—Milton Buchler
Assistant Examiner—John J. McLaughlin
Attorney—Stevens, Davis, Miller & Mosher ABSTRACT: The braking effort-limiting device comprises two closely interfitting valve bodies each enclosing a valve and a single control member engaging directly the valve of one body, said valve being adapted in turn to drive directly the valve of the second body responsive to the action of an antagonistic spring.

PATENTED MAY 18 1971

INVENTOR
MICHEL GUETTIER
By Stevens, Davis, Miller & Mosher
ATTORNEYS

INVENTOR
MICHEL GUETTIER
ATTORNEYS

BRAKE LIMITERS

The present invention relates to a braking effort-limiting relay adapted to be interposed in a twin-circuit hydraulic braking system of an automotive vehicle for limiting, as a function of a parameter or factor intervening in the operation of the vehicle, i.e. the static load on the wheels of one axle, the pressure of the control fluid supplied to the brake lines.

Relays of this general type are already known which, when interposed in the brake control lines, are adapted to deliver to the controlled members located downstream of the limiter a fluid pressure not in excess of a predetermined value reduced with respect to that generated by the control members delivering pressure fluid to said limiter.

These known limiting devices comprise as a rule a valve member rigid with a piston responsive on the one hand to the pressure of the supply fluid and on the other hand to the force of an antagonistic spring and the atmospheric pressure. When the pressure of the supply fluid attains a predetermined value the piston compresses the spring and the valve member driven by said piston cuts off the communication between the supply source, for example a master cylinder, and the controlled member disposed downstream of the limiting relay. As a consequence, the pressure acting upon these members is limited to a value which, according to the type of relay involved, may be either a fixed maximum value or a maximum value depending on the momentary load carried by an axle, or alternately a variable value subordinate to the supply fluid pressure.

However, in the case of known twin braking circuits, difficulties are experienced when mounting a brake limiter of this type. In this case two devices controlled by a compensator or two control devices must be used. Therefore, such a mounting is both costly and delicate to install.

It is the chief object of the present invention to provide twin-value limiter for twin-circuit braking systems, which is particularly simple and requires a control effort not in excess of that necessary for operating a single-circuit limiter, and which can be mounted without any modification on a vehicle already equipped with a brake limiter.

This brake limiter is characterized in that it comprises two closely connected valve bodies each provided with a valve member and a single control member acting directly upon the valve member of one of said bodies, said valve member being adapted in turn to act directly upon the valve member of the other body which is responsive to a reaction spring.

Other features and advantages of this invention will appear as the following description proceeds with reference to the attached drawings illustrating diagrammatically by way of example a typical form of embodiment of a brake limiter constructed according to the teachings of this invention. In the drawings.

Figure 2:
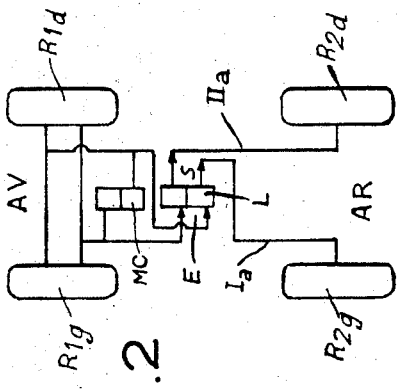
FIGS. 1 and 2 are hydraulic control circuit diagrams of known braking systems of vehicles.
Figure 1:
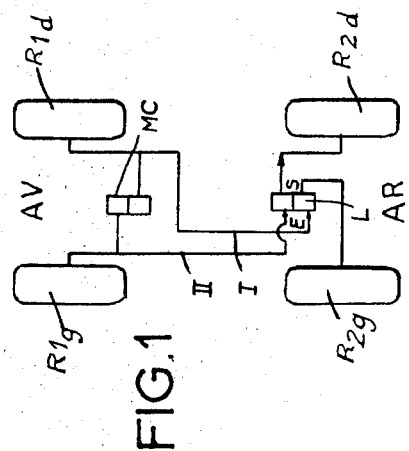

Referring to the drawings, FIGS. 1 and 2 illustrate diagrammatically known twin hydraulic control circuits for automotive vehicles as already mentioned hereinabove. The vehicle of FIG. 1 comprises a first brake control circuit I leading to the right-hand wheel R1d of the front axle AV and to the left-hand wheel R2g of the rear axle AR, and a second brake control circuit II connected to the brakes of the left-hand wheel R1g of front axle AV and to the right-hand wheel R2d of rear axle AR. According to this arrangement, a single brake limiter L (FIG. 1) having a single control member and supplied with fluid under pressure at E is connected at S to the two brake circuits of the wheels of the rear axle AR, the front axle brake circuits being supplied with pressure fluid directly from the master cylinder MC.

Similarly, in the vehicle illustrated diagrammatically in FIG. 2, which comprises a first brake control circuit Ia connected to the brakes of the pair of front wheels AV and to the left-hand wheel R2g of the rear axle AR, and a second brake control circuit IIa connected to the brakes of the pair of front wheels AV and to the right-hand wheel R2d of the rear axle AR, a limiter L having its fluid inlets connected to the master cylinder MC has its fluid outlets S connected to the rear axle brake circuits Ia and IIa.

Figure 3:
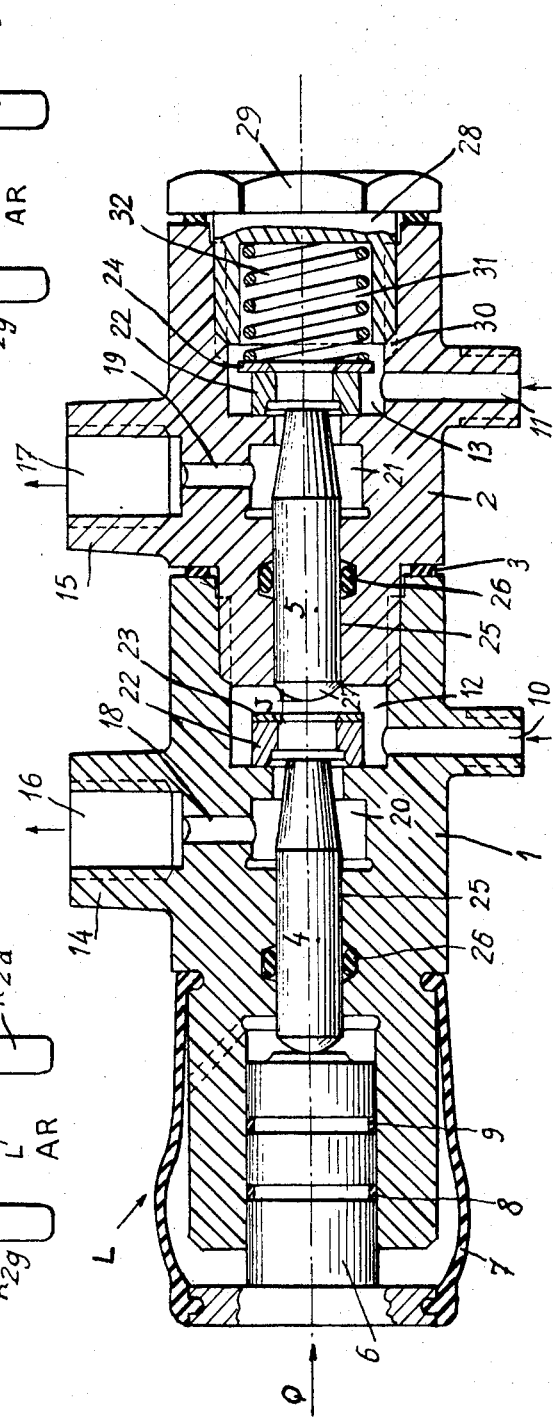
FIG. 3 illustrates in axial longitudinal section and on a considerably larger scale a twin limiter according to this invention.

Referring now to FIG. 3, it will be seen that the limiter L according to this invention consists of two bodies 1 and 2 fitted in axial alignment into each other, a gasket 3 being interposed between these bodies to seal the joint. Sliding valve members 4 and 5 are mounted in these bodies respectively, in axial alignment. A control force Q exerted against the pushrod 6 will move through the medium of this rod 6 the valve member 4 of the first body 1 inwards, this valve member 4 moving in turn the other valve member 5; the force Q will thus tend to keep both valve members 4 and 5 unseated. The push member 6 is protected by a cylinder boot 7 and adapted to slide in a bore formed in said body. This sliding movement is facilitated by a pair of piston rings 8 and 9 fitting in corresponding grooves of pushrod 6. The valve bodies 1 and 2 comprise two inlets 10 and 11 for the pressure fluid delivered for instance by a double brake control master cylinder (not shown); these inlets open the one into a chamber 12 formed between the two bodies and into a chamber 13 formed in the second body 2 respectively. These chambers 12 and 13 are adapted, when valves 4 and 5 are unseated, to communicate with the fluid outlets 14 and 15 each provided with a tapped hole 16, 17, respectively, for connecting these outlets to pipelines (not shown) leading to the brake circuits. These tapped holes lead through passages 18, 19 respectively into a pair of chambers 20, 21 formed in bodies 1 and 2, respectively.

Each valve member 4, 5 is provided with a valve seal 22 crimped on the relevant valve member after interposing a washer 23, 24, respectively. The valve members 4 and 5 are each adapted to slide in a bore 25 of the valve member which is sealed by a packing 26. In the closed valve position the free end 27 of valve member 5 projects into the chamber 12 of body 1 while leaving a slight play J between the two valve members 4 and 5, and the inlet chambers 12, 13 are separated by the body 2 and outlet chamber 21.

A tapped and bored plug 28 formed with a hexagonal head 29 is screwed in a tapped hole 30 of body 2 to seal same, with the interposition of a suitable gasket, of course. The bore 31 of this plug receives one end of a coil compression spring 32 bearing with its opposite end against the washer 24 of valve member 5. This spring 32 is calibrated with a view to overcome only the frictional resistance acting upon the rod of valve member 5, and constantly urges this valve member to its closed position.

Figure 4:
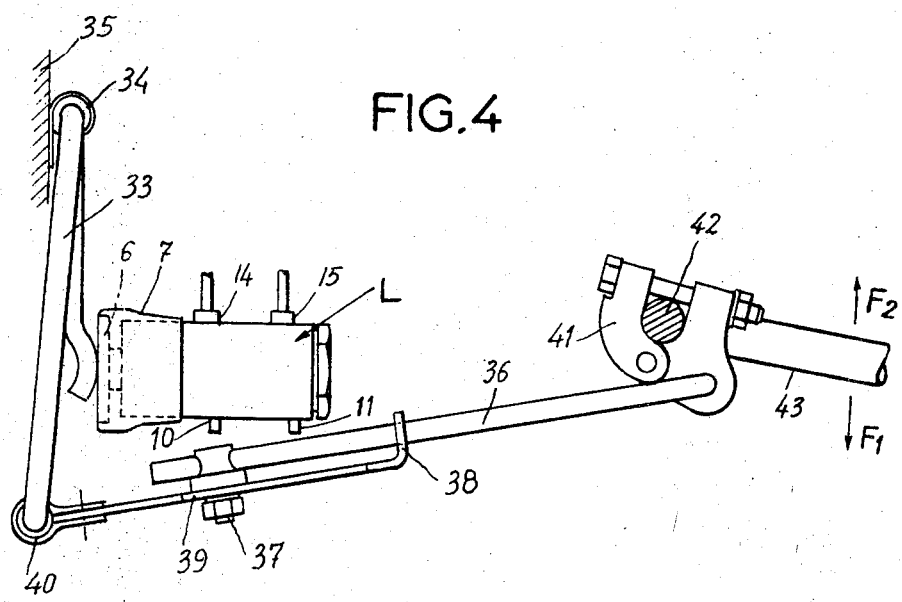
FIG. 4 illustrates in elevational view details of a typical linkage for controlling a limiter of the type shown in FIG. 3.
Figure 5:
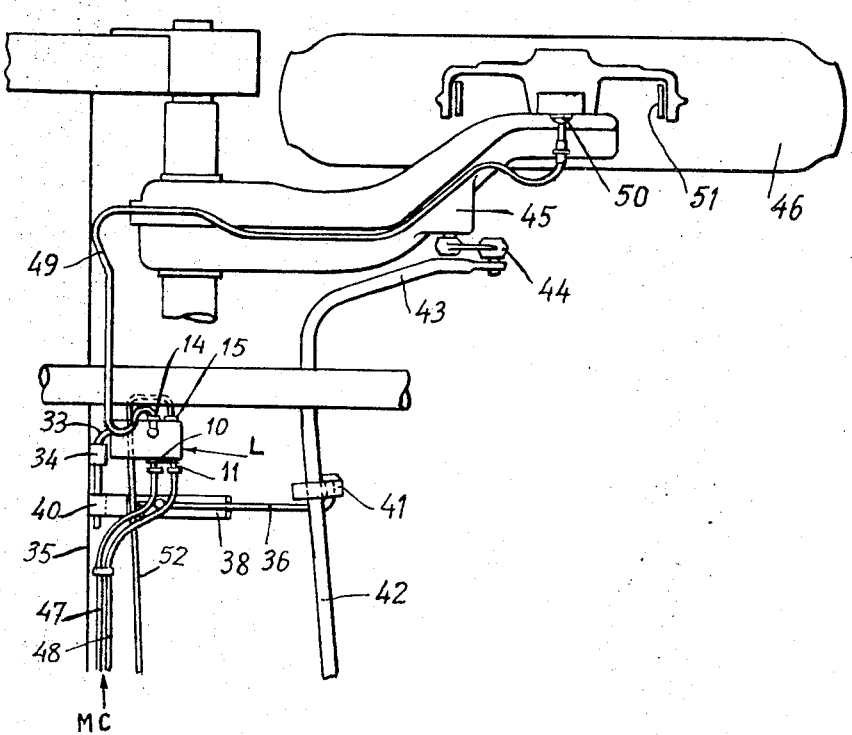
FIG. 5 shows in plan view a typical mounting of a limiter according to this invention and its hydraulic connections with the rear wheels of a vehicle.

Referring now to FIGS. 4 and 5 of the drawings, it will be seen that a spring 33 reacting against the pushrod 6 of limiter L has one end pivoted in a bearing 34 rigid with the chassis or body 35 of the vehicle and adapted to be actuated by means of a control rod 36 clamped in the head of a screw 37 locked by a nut and secured to a flat metal member 38 formed with a series of aligned holes or a single elongated slot 39 permitting of adjusting at will the position of said rod 36. The flat metal member 38 is provided with a bearing 40 pivotally engaged by the opposite end of spring 33. Rod 36 is rigid with a clamping strap 41 secured to a torsion bar 42 of an antiroll device of the vehicle which has end portions 43 bent at right angles and adapted to act as lever arms connected through links 44 to the suspension arms 45 of the rear wheels 46 of the vehicle. The torsion bar 42 is subjected to an angular movement consistent with the load carried by the suspension, so that the relevant lever arms 43 move in the direction of the arrows F1 or F2; thus, the strap 41 will move the spring 33 through the medium of rod 36, and the pressure Q exerted by this spring 33 on pushrod 6 of limiter L will vary in one or the other direction.

As shown in FIG. 5 the inlets 10 and 11 of limiter L are connected via pipelines 47 and 48 to the twin master cylinder MC (not shown) supplying fluid under pressure to said limiter when the brake pedal is depressed. The outlets 14 and 15 of this limiter are connected the one via a pipeline 49 to the first brake circuit associated with the rear axle of the vehicle, connected in turn to the brake cylinder 50 of the brake 51 of the right-hand rear wheel 46, and the other via a pipeline 52 to the brake circuit leading to the left-hand rear wheel (not shown). The return flow of hydraulic fluid to the reservoir takes place through the device.

This arrangement operates as follows in the different cases likely to arise during the operation of the vehicle:

First case: Both brake circuits are operative.

When no pressure is exerted on the brake pedal, no fluid is delivered to limiter L and the fluid pressure is zero in both inlet chambers 12 and 13. The force Q then caused by the angular movement of torsion bar 42 through the medium of control spring 33 and exerted against the pushrod 6 will unseat the valve member 4 and the latter will unseat in turn the other valve member 5. Then both valves are open and a fluid communication is established between the fluid inlets 10, 11 and the corresponding outlets 16, 17. When the driver of the vehicle depresses the brake pedal, a pressure $p_1$ builds up in chamber 12 and another pressure $p_2$ builds up in chamber 13. Let us denote $s$ the cross-sectional area of the valve member receiving the fluid pressure; if this pressure increases as an effort is exerted on the brake pedal, at a certain time the pressure $p_1=p_2$ will be such that the pressure force $p_1 \cdot s > Q$. Under these conditions the valve member 4 will move the pushrod 6 back and resume its seated position. The other valve member 5 subjected to two equal and opposed forces $p_1 \cdot s$ and $p_2 \cdot s$ is reseated by the force of spring 32.

Second case: The circuit of valve body 1 operates alone, no pressure $p_2$ being produced for any accidental reason.

When no pressure is exerted on the brake pedal, no fluid is delivered to the limiter L and the pressure is zero in both inlet chambers 12 and 13. The force Q then caused by the angular movement of torsion bar 42 through the medium of control spring 33 and exerted against the pushrod 6, will unseat the valve member 4 and the latter will unseat in turn the other valve member 5. Then both valves are open and a fluid communication is established between the fluid inlets 10, 11 and the corresponding outlets 16, 17. When the driver of the vehicle depresses the brake pedal, a pressure $p_1$ builds up in chamber 12. The pressure $p_1$ increases with the effort exerted on the brake pedal; at a certain time this pressure will be such that the pressure force $p_1 \times s$ slightly exceeds the value of Q. The valve member 4 in body 1 will then resume its seated position. The valve member 5 in body 2 thus is receiving the effort $p_1 \times s$ which the spring 32 cannot overcome. This valve member 5 remains unseated, but the pressure is zero in the outlet circuit 17.

Third case: The circuit of valve body 2 operates alone, as no pressure $p_1$ is available as a consequence of an incident of any nature.

When no pressure is exerted on the brake pedal, no fluid is delivered to the limiter L and the pressure is zero in both inlet chambers 12 and 13. The force Q then caused by the angular movement of torsion bar 42 through the medium of control spring 33 and exerted against the pushrod 6, will unseat the valve member 4 and the latter will unseat in turn the other valve member 5. When both valves are open, a fluid communication is established between the fluid inlets 10, 11 and the corresponding outlets 16, 17. When the driver of the vehicle depresses the brake pedal, a pressure $p_2$ increases as an effort is exerted on the brake pedal; at a certain time this pressure will be such that the pressure force $p_2 \times s$ slightly exceeds the value of Q. The valve member 5 in body 2 will then resume its seated position and push valve member 4 and pushrod 6 backwards. The valve member 4 remains unseated, because there is play between the two valve members 4 and 5, but the pressure is zero in the outlet circuit 16.

It will be seen subsequently that for a determined value of the control force Q (which is the same if there is a simple circuit limiter), the braking pressure is always limited in the operative circuits or in the circuit which is not in failure.

I claim:

1. A braking force limiter for a twin-circuit hydraulic braking system in an automotive vehicle controlled by a master cylinder supplying pressure fluid and operated by a brake pedal, said limiter comprising first and second interfitting valve bodies, a single sliding control member in said first body responsive to the action of mechanical means as a function of a vehicle operation parameter, a first sliding valve member sliding in the first body having a sliding rod integral with a valve seal, a second sliding valve member sliding in the second body having a second sliding rod integral with a second valve seal, a return spring in said second body, a first inlet chamber for brake control fluid between said first body and said second body and communicating with a first inlet port, a first output chamber in said first body and communicating with a first output port, a second inlet chamber for brake control fluid communicating with a second inlet port and a second output chamber communicating with a second output port, both said second inlet chamber and said second output chamber being in said second body, each said valve seal in its closed position preventing communication between each inlet chamber and its corresponding output chamber, the inlet port of each inlet chamber being connected to said master cylinder and the output port of each output chamber being connected to the brakes of one wheel of a pair of wheels of the vehicle, said sliding control member being in direct engagement with the sliding rod of said first sliding valve member, the valve seal of said first valve member being adapted to directly drive the free end of said second sliding rod which is opposite to the second seal valve of said second valve member and extends into said first fluid input chamber, a slight play being left between said first valve seal and said free end of the second sliding rod in seated position of both valves, and said return spring in said second body engaging said second valve seal and being so calibrated that it can only overcome the frictional resistance encountered by said second valve member.